US008479265B2

(12) United States Patent
Maes

(10) Patent No.: US 8,479,265 B2
(45) Date of Patent: Jul. 2, 2013

(54) USAGE BASED AUTHORIZATION

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 860 days.

(21) Appl. No.: 12/166,535

(22) Filed: Jul. 2, 2008

(65) Prior Publication Data

US 2010/0005511 A1   Jan. 7, 2010

(51) Int. Cl.
G06F 7/04   (2006.01)
(52) U.S. Cl.
USPC .............................................. 726/4; 713/165
(58) Field of Classification Search
USPC ............................................................. 726/4
See application file for complete search history.

(56) References Cited

U.S. PATENT DOCUMENTS

| | | | |
|---|---|---|---|
| 6,035,025 A | 3/2000 | Hanson | |
| 6,044,403 A | 3/2000 | Gerszberg et al. | |
| 6,105,137 A | 8/2000 | Graunke et al. | |
| 7,043,553 B2 * | 5/2006 | Monsen et al. | 709/229 |
| 7,137,003 B2 | 11/2006 | Krishnan et al. | |
| 7,194,503 B2 | 3/2007 | Shell et al. | |
| 7,403,763 B2 | 7/2008 | Maes | |
| 7,487,493 B1 | 2/2009 | Faulkner | |
| 7,869,788 B2 | 1/2011 | Maes | |
| 2002/0176579 A1 | 11/2002 | Deshpande et al. | |
| 2002/0178381 A1 | 11/2002 | Lee et al. | |
| 2003/0027549 A1 | 2/2003 | Kiel et al. | |
| 2003/0135746 A1 | 7/2003 | Abbott et al. | |
| 2003/0233322 A1 | 12/2003 | Uchida et al. | |
| 2004/0044623 A1 | 3/2004 | Wake et al. | |
| 2004/0054923 A1 * | 3/2004 | Seago et al. | 713/201 |
| 2004/0059939 A1 * | 3/2004 | de Jong | 713/200 |
| 2004/0098715 A1 | 5/2004 | Aghera et al. | |
| 2004/0133909 A1 | 7/2004 | Ma | |
| 2004/0209595 A1 | 10/2004 | Bekanich | |
| 2005/0053241 A1 | 3/2005 | Fan et al. | |
| 2005/0154933 A1 | 7/2005 | Hsu et al. | |
| 2005/0210499 A1 | 9/2005 | Shima | |
| 2006/0040642 A1 | 2/2006 | Boris et al. | |
| 2006/0184640 A1 | 8/2006 | Hatch | |
| 2006/0217107 A1 | 9/2006 | Maes | |
| 2007/0067297 A1 | 3/2007 | Kublickis | |

(Continued)

OTHER PUBLICATIONS

U.S. Appl. No. 12/986,432, filed Jan. 7, 2011, Office Action dated Apr. 11, 2012, 15 pages.

(Continued)

*Primary Examiner* — Cordelia Zecher
(74) *Attorney, Agent, or Firm* — Kilpatrick Townsend & Stockton LLP

(57) ABSTRACT

Embodiments of the invention provide systems and methods for authorizing a request to access a resource based on a context of the request. According to one embodiment, a method of authorizing a request for a resource based on a context of the request can comprise receiving the request from a requester, identifying the context of the request, and determining whether to authorize the request based on the context of the request. In some cases, the request can include context information describing the context of the request. In such cases, identifying the context can be based at least in part on the context information from the request. Additionally or alternatively, context information describing the context can be requested and received in response to the request. In such a case, identifying the context can be based at least in part on the received context information.

27 Claims, 7 Drawing Sheets

U.S. PATENT DOCUMENTS

| | | |
|---|---|---|
| 2007/0143827 A1 | 6/2007 | Nicodemus et al. |
| 2007/0244750 A1 | 10/2007 | Grannan et al. |
| 2008/0126779 A1 | 5/2008 | Smith |
| 2009/0037594 A1 | 2/2009 | Sever et al. |
| 2009/0049309 A1 | 2/2009 | Brinker et al. |
| 2010/0064341 A1 | 3/2010 | Aldera |
| 2010/0325427 A1 | 12/2010 | Ekberg et al. |
| 2011/0010543 A1 | 1/2011 | Schmidt et al. |
| 2011/0166943 A1 | 7/2011 | Maes |
| 2011/0167153 A1 | 7/2011 | Maes |
| 2011/0167479 A1 | 7/2011 | Maes |
| 2011/0196728 A1 | 8/2011 | Maes |
| 2011/0197257 A1 | 8/2011 | Maes |
| 2011/0197260 A1 | 8/2011 | Maes |
| 2012/0030771 A1 | 2/2012 | Pierson et al. |
| 2012/0278869 A1 | 11/2012 | Guccione et al. |

OTHER PUBLICATIONS

U.S. Appl. No. 12/986,432, filed Jan. 7, 2011, Final Office Action dated Jul. 31, 2012, 18 pages.

U.S. Appl. No. 13/022,377, filed Feb. 7, 2011, Non-final Office Action mailed Dec. 6, 2012, 37 pages.

U.S. Appl. No. 13/022,367, filed Feb. 7, 2011, Non-final Office Action mailed Dec. 17, 2012, 24 pages.

U.S. Appl. No. 12/986,432, filed Jan. 7, 2011, Advisory Action dated Oct. 19, 2012, 2 pages.

* cited by examiner

USAGE BASED AUTHORIZATION

BACKGROUND OF THE INVENTION

Embodiments of the present invention relate generally to methods and systems for authorizing a request to access a resource and more particularly to authorizing a request to access a resource based on a context of the request.

Access to and use of resources such as network resources can be controlled in a number of different ways. For example, an Access Control List (ACL) can be used to control access to a resource identified in the list. Generally speaking, the ACL is a list or set of data defining permissions, e.g., read, write, execute, for a user or group of users to access a specific resource. The requesting user is then granted or denied permission to access the requested resource based on the roles or permissions defined for that user or user's group defined in the ACL. In another example, Authentication, Authorization, and Accounting (AAA) systems can be used to authorize a request for a resource. Generally speaking, the AAA system, upon receiving or detecting a request for a resource, can authenticate the requester, i.e., identify the requester as who he claims to be, and authorize the request. Again, the requester is granted or denied permission for the request by mapping the requestor's identify and the requested access to roles and rights defined for the resource.

However, these different approaches to controlling access to a resource have some limitations. For example, while these systems consider the identity of the requester, the resource or data requested, and the functions to be performed, i.e., read, write, execute, they do not consider a broader context of the request. That is, these systems do not consider such factors as what the requester plans to do with the data, why the requestor is requesting the operation, under what condition(s) is the requestor making the request, on whose behalf is the requester making the request, etc. Thus, there are no generic ways to provide authorization of an operation for a particular usage or within a particular context. Hence, there is a need for improved methods and systems for authorizing a request to access a resource based on a context of the request.

BRIEF SUMMARY OF THE INVENTION

Embodiments of the invention provide systems and methods for authorizing a request to access a resource based on a context of the request. According to one embodiment, a method of authorizing a request for a resource based on a context of the request can comprise receiving the request from a requester, identifying the context of the request, and determining whether to authorize the request based on the context of the request. The context con comprise any of a wide range of conditions as will be described. In one example, the context can comprise the intended use of the resource by the requester. This may be something that the entity that authorizes the request can check or determine itself in any of a number of different ways. For example, the request can include metadata or other information describing the context of the request. In such cases, identifying the context can be based at least in part on the metadata or other information from the request. Additionally or alternatively, information describing the context can be requested and received in response to the request. The information describing the context can be requested, for example, from the device of entity requesting the resource or from another device or entity. In such a case, identifying the context can be based at least in part on the received information.

According to one embodiment, determining whether to authorize the request can comprise applying one or more policies to the request and the context of the request. In some cases, determining whether to authorize the request can additionally or alternatively comprise delegating at least a part of the determination. According to one embodiment, in response to determining to authorize the request, the request can be passed to the resource. According to another embodiment, in response to determining to authorize the request, a response can be returned to the requester indicating authorization. In some cases, the response can include authorization information such as a token or other signed or encrypted or tamper proof credential/document that can be used for accessing the resource. In any event, the authorization and indication thereof and subsequent access to the resource can be conditioned upon the use of the resource and the context for which the request was authorized.

According to another embodiment, a system can comprise a requestor adapted to request access to a resource and an authorization enabler communicatively coupled with the requester. The authorization enabler can be adapted to receive the request from the requester, identify a context of the request, and determine whether to authorize the request based on the context of the request. In one example, the context can comprise the intended use of the resource by the requester. For example, the request can include metadata or other information describing the context of the request. In such a case, the authorization enabler can be adapted to identify the context based at least in part on the metadata or other information from the request. Additionally or alternatively, the authorization enabler can be adapted to request information describing the context. The information describing the context can be requested, for example, from the device of entity requesting the resource or from another device or entity. In such a case, the authorization enabler can be further adapted to receive the information describing the context in response to the request and identify the context based at least in part on the received information.

The authorization enabler can determine whether to authorize the request by applying one or more policies to the request and the context of the request. In some cases, the authorization enabler can additionally or alternatively determine whether to authorize the request further by delegating at least a part of the determination. In response to determining to authorize the request, the authorization enabler can pass the request to the resource. Alternatively, in response to determining to authorize the request, the authorization enabler can return a response to the requestor indicating authorization. In such a case, the response can include authorization information such as a token for accessing the resource. In any event, the authorization and indication thereof and subsequent access to the resource can be conditioned upon the use of the resource and the context for which the request was authorized.

According to yet another embodiment, a machine-readable medium can have stored thereon a series of instructions which, when executed by a processor, cause the processor to authorize a request for a resource based on a context of the request by receiving the request from a requester, identifying the context of the request, and determining whether to authorize the request based on the context of the request. In one example, the context can comprise the intended use of the resource by the requester. In some cases, the request can include metadata or other information describing the context of the request. In such cases, identifying the context can be based at least in part on the metadata or other information from the request. Additionally or alternatively, information describing the context can be requested and received in response to the request. The information describing the context can be requested, for example, from the device of entity requesting the resource or from another device or entity. In such a case, identifying the context can be based at least in part on the received information.

According to one embodiment, determining whether to authorize the request can comprise applying one or more policies to the request and the context of the request. In some cases, determining whether to authorize the request can additionally or alternatively comprise delegating at least a part of the determination. According to one embodiment, in response to determining to authorize the request, the request can be passed to the resource. According to another embodiment, in response to determining to authorize the request, a response can be returned to the requester indicating authorization. In some cases, the response can include authorization information such as a token for accessing the resource. In any event, the authorization and indication thereof and subsequent access to the resource can be conditioned upon the use of the resource and the context for which the request was authorized.

DETAILED DESCRIPTION OF THE INVENTION

Figure 1:
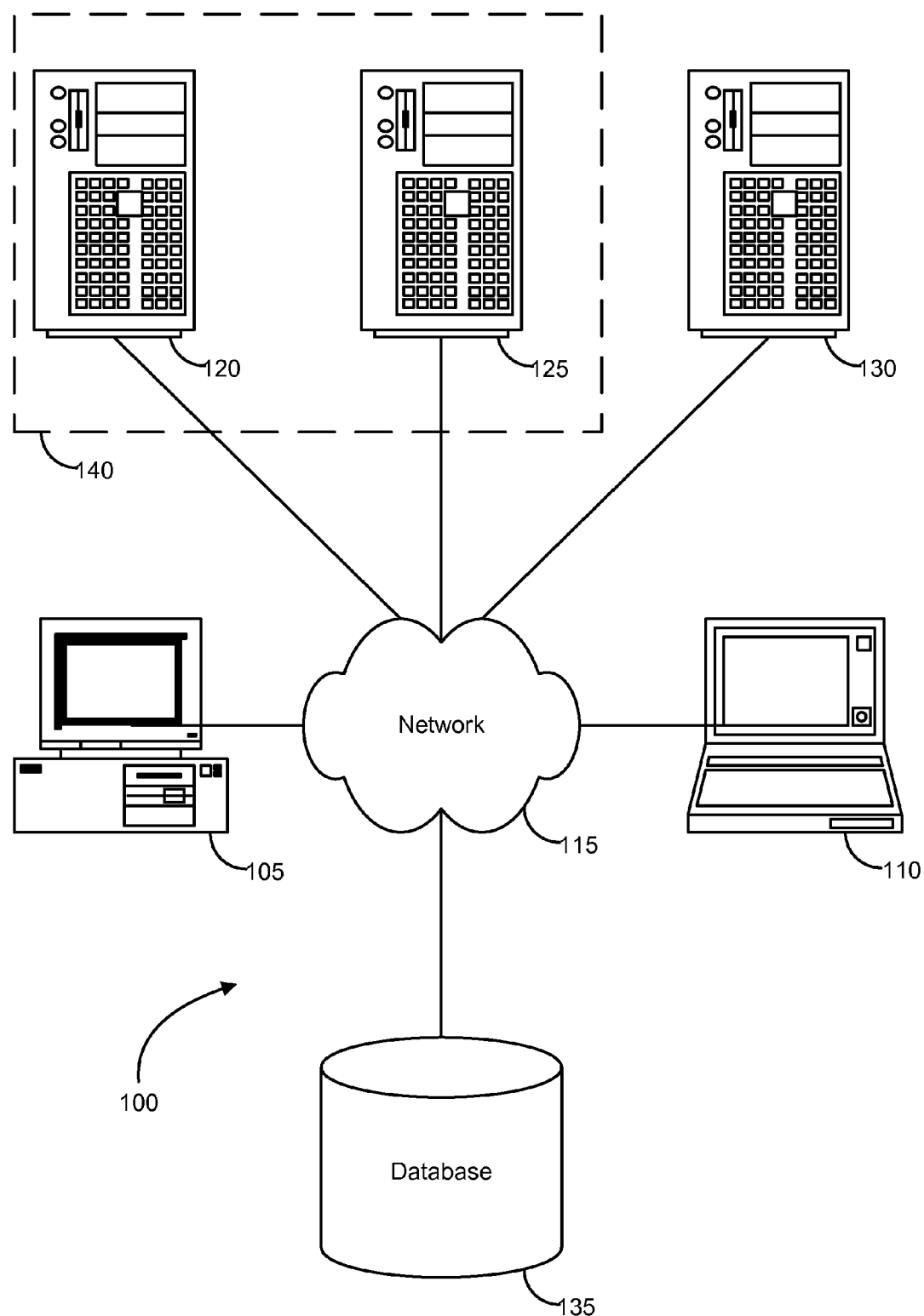
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for authorizing a request to access a resource. More specifically, embodiments of the present invention provide for authorizing a request to access a resource based on a context of the request. The context can comprise, for example, who made the request, for what purpose or what intended use, what will take place if the request is granted, the identity of another party on behalf of whom the request is made, and other context information such as time of day, location, etc. According to one embodiment, the request can include metadata or other information describing the context or the request. Such information can include, but is not limited to, attribute-value pairs or arguments passed in any desired way like by reference or by value and defining the context. In some cases, either instead of or in addition to information identifying the context of the request being included in the request, context information can be specifically requested from the requester, i.e., from the entity requesting to access the resource, or from another component of set of components and returned in reply to the request for the context. For example, context information can be requested from the original requester and/or from another process, system, entity, etc. Thus, authorizing a request for a resource can be based on the context information from the request for the resource and/or the context information requested or queried from the requester or other element of the system. In yet another example, context information can be obtained/provided via a subscribe/notify model. For example, one or more entities can subscribe to context information related to one or more requesters. The context information can be published and/or maintained by the requester and/or another component or set of components. Upon a change in the context information, the one or more subscribers can be notified of the change. Thus, the system that authorizes the request based on the context has access to the context information and any change therein that may affect the authorization allowing the system to revoke authorization if appropriate.

According to one embodiment, determining whether to authorize the request can comprise applying one or more policies to the request and the context of the request. As used herein, a policy can be defined as any logical combination of any condition and any one or more associated actions to be performed upon the satisfaction of the condition. Therefore, policies applied to requests and information defining the context of the request can be defined for determining whether to authorize the request based on who makes the request, from where, for whom, for what purpose, etc as well as what actions to be taken upon authorization or failure of authorization. Various exemplary methods and systems for applying policies to affect context based authorization are described in U.S. patent application Ser. No. 10/856,588 filed May 28, 2004 by Maes and entitled "Method and Apparatus for Supporting Service Enablers Via Service Request Composition," U.S. patent application Ser. No. 10/855,999 filed May 28, 2004 by Maes and entitled "Method and Apparatus for Supporting Service Enablers Via Service Request Handholding," U.S. patent application Ser. No. 11/024,160 filed Dec. 27, 2004 by Maes and entitled "Policies as Workflows," and U.S. patent application Ser. No. 11/565,578 filed Nov. 30, 2006 by Maes and entitled "Orchestration of Policy Engines and Format Technologies" of which the entire disclosure of each is incorporated herein by reference for all purposes.

In response to determining to authorize the request, the request can be passed to the resource. In another example, in response to determining to authorize the request, a response can be returned to the requester indicating authorization. In some cases, the response can include a authorization information such as a token or other signed or encrypted or tamper proof credential that can be used for accessing the resource. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/ Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, smartphone Personal Digital Assistant (PDA), set-top box, and/or other computing device, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, HSDPA, WiMAX, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
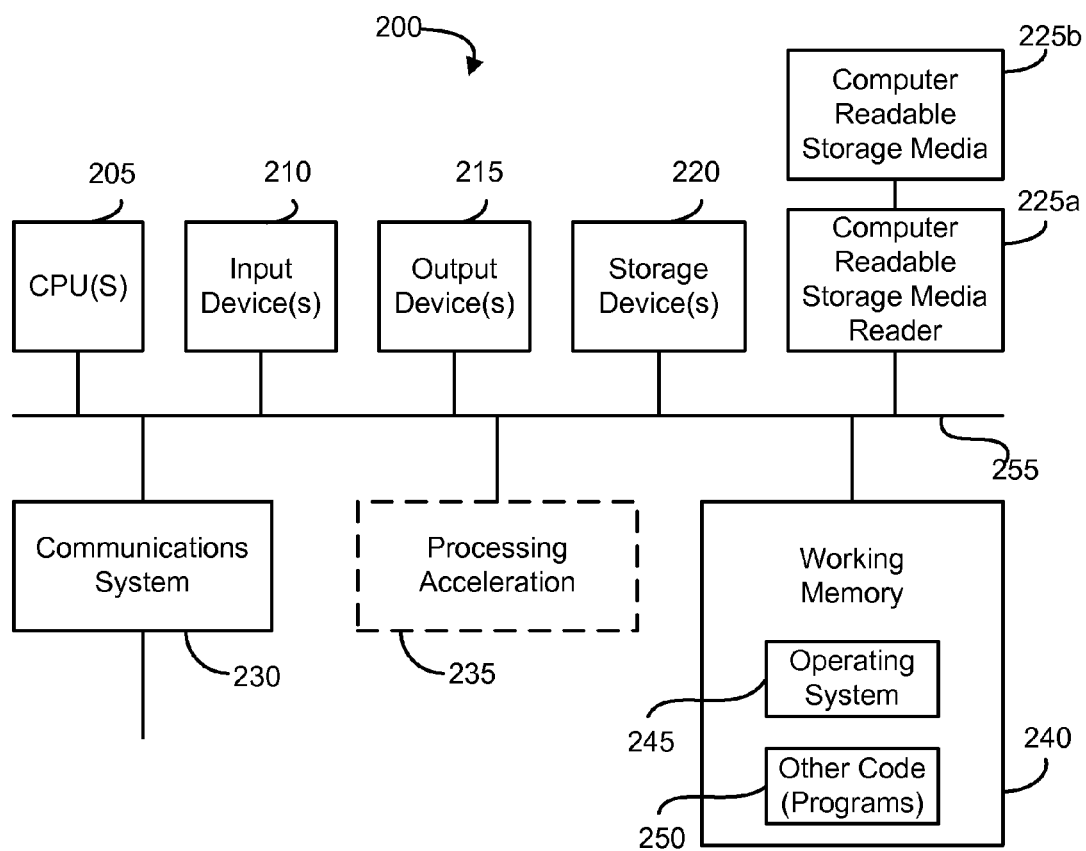
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
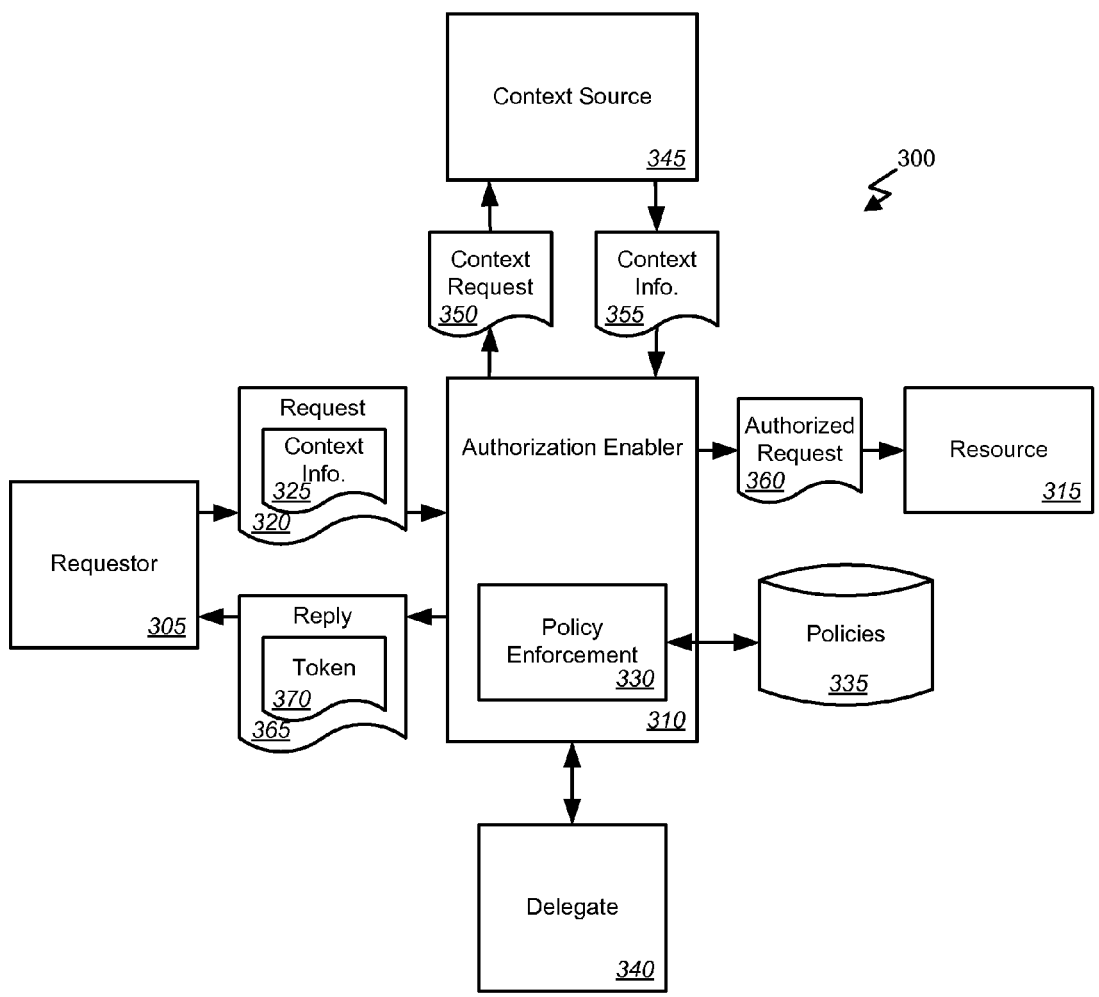
FIG. 3 is a block diagram illustrating, at a high-level, functional components of a system for authorizing a request to access a resource according to one embodiment of the present invention.

FIG. 3 is a block diagram illustrating, at a high-level, functional components of a system for authorizing a request to access a resource according to one embodiment of the present invention. In this example, the system 300 includes a requester 305, an authorization enabler 310, and a resource 315. The requestor 305 can be communicatively coupled with a network (not shown here) such as the Internet or any other local or wide area network as described above and can comprise any device, system, agent, application, or other entity able to communicate with and access the resource 315. The resource 315 can also be communicatively coupled with the network (not shown here) and can similarly comprise any device, system, agent, application, etc. For example, the resource 315 may comprise a database or other data repository. However, it should be understood that as used herein, the resource 315 can represent any network resource, element, data, entity, etc. and is not limited to a database or repository.

The authorization enabler 310 can also be communicatively coupled with the network (not shown here) and can receive or detect a request 320 from the requestor 305 to access the resource 315. Alternatively, the authorization enabler 310 can be part of an interceptor in proxy mode that intercepts and then query the context from the requestor 320 or other component or set of components of the system 300. According to one embodiment, the request 320 can include context information 325 provided by the requestor 305 and defining the context of the request. As noted above, the context information 325 can comprise metadata or other attribute-value pairs, or arguments passed by value or by reference, etc. and defining the context, for example, in terms of who made the request, for what purpose or intended use, what will take place if the request is granted, the identity of another party on behalf of whom the request is made, and other context information such as time of day, location, or any other information.

However, the request 320 need not include the context information 325. Rather, the context information 325 may be requested from the requestor 305 or another element of the system 300 by the authorization enabler 310 as needed and provided separately in response to the authorizations enabler's 310 context request. Furthermore, in addition to or instead of context information 325 provided by the requestor 305, either as part of the request 325 to access the resource 315 or in response to a context request from the authorization enabler 310, context information 355 describing the context of the request 320 can be provided by other elements of the system 300 such as context source 345. That is, one or more context sources 345 can be communicatively coupled with the authorization enabler 310 and can receive a context request 350 from the authorization enabler 310. In response to this request 350 or query, the context source 345 can provide context information 355, e.g., metadata or other attribute value pairs, arguments passed by reference or value, etc., defining the context of the request 320. For example, the context source 345 can comprise a location server that maintains current location information for the requester 305 and, in response to the context request 350 from the authorization enabler 310, provides context information 355 defining or identifying that current location. It should be understood that, while one context source 345 is illustrated and described here for the sake of simplicity, any number of context sources 345 providing a variety of context information as described herein may be used depending upon the exact implementation of the system 300.

According to one embodiment, context information 325 or 355 can be obtained/provided via a subscribe/notify model. That is, one or more entities can subscribe to context information related to one or more requesters 305. For example, the authorization enabler 310, or resource 315 can subscribe to context information related to requestor 305. The context information can be maintained by the requester 305 and/or another component or set of components such as the authorization enabler 310 or context source 345. So, for example, the requester 305 can publish context information to the context source 345 which can in turn maintain the context information. Upon a change in the context information, the context source 345 can notify one or more subscribers, such as the authorization enabler 310, of the change. Thus, the system that authorizes the request, e.g., the authorization enabler 310, based on the context has access to the context information and any change therein that may affect the authorization allowing the system to revoke authorization if appropriate.

Upon receiving the request 320 to access the resource 315 and the context information 325 or 355 defining the context of the request 320, the authorization enabler 310 can determine whether to grant or deny permission to the requestor 305 to access the resource 315. For example, the authorization enabler 310 can include a policy enforcement module 330 adapted to apply one or more policies 335 to the request 320 to access the resource 315 and the metadata 325 and/or 355 defining or describing the context of the request 320. As noted, the policies 335 can comprise logical combinations of conditions and associated actions to be performed upon the satisfaction of the condition(s). Therefore, policies 335 can be defined for determining whether to authorize the request based on who makes the request, from where, for whom, for what purpose, etc as well as what actions to be taken upon authorization or failure of authorization.

According to one embodiment, the authorization enabler 310 may delegate some or all of the process of authorizing the request to another element of the system 300. For example, the system 300 can include one or more delegates 340 communicatively coupled with the authorization enabler 310. The delegate 340 can comprise any device, system, agent, application, etc. adapted to perform one or more various authentication functions. For example, the delegate 340 can be adapted to perform authentication, authorization, accounting, or other functions. The functions performed by the delegate 340 can be based on the policies 335. It should be understood that, while one delegate 340 is illustrated and described here for the sake of simplicity, any number of delegates 340 providing a variety of functions may be used depending upon the exact implementation of the system 300.

Upon authorization of the request 320, the authorization enabler 310 can handle the request 320 in a number of different ways. For example, the authorization enabler 320 can pass the authorized request 360 to the resource 315 to allow the requestor 305 to access the resource 315. In other cases, the authorization enabler 310 can perform or request, on behalf of the requestor 305, an action related to the resource 315 and appropriate to the request 320. Alternatively, the authorization enabler 310 can generate and return a reply message 365 to the requestor 305 indicating authorization. In some cases, the reply message 365 can include a token 370 or other credential to then be used by the requestor 305 to access the resource 315. That is, the token 370 can be used by the requester 305 to directly request access from the resource 315. In doing so, the requestor 305 can provide the token 370 to the resource which in turn permits or denies access based on the token 370. In some cases, the resource may verify the token with the authorization system prior to granting access. It should be understood that upon failure of authorization, the authorization enabler 310 may return another message (not shown here) to the requestor 305 indicating the denial of permission to access the resource 315.

According to one embodiment, the requestor 305 may be a trusted entity that is assumed to honestly and accurately represent the context of the request and will abide by that representation. Additionally or alternatively, the system may be adapted to enforce the authorization when the requestor 305 tries to use the authorization based on the context/usage that it described or committed to and has been granted the right to perform. According to one embodiment, such enforcement can be provided according to the methods and systems described, for example, in co-pending U.S. patent application Ser. No. 12/986,435 filed on Jan. 7, 2011 by Maes and entitled "Enforcement of Policies on Context-Based Authorization", the entire disclosure of which is incorporated herein by reference for all purposes. In such an embodiment, the requester cannot access a resource without requesting the access based on the context and cannot use the resource differently than requested without either having usage denied or future usage denied, i.e., the requestor lost trustworthiness.

Therefore, the requestor 305 can be adapted to request 320 access to the resource 315. The authorization enabler 310 can be adapted to receive the request 320 from the requester 305, identify a context of the request 320, and determine whether to authorize the request 320 based on the context of the request 320. For example, the request 320 can include context information 325 such as metadata or other information describing the context. In such a case, the authorization enabler 310 can be adapted to identify the context based at least in part on the context information 325 from the request 320. Additionally or alternatively, the authorization enabler 310 can be adapted to request 350 context information describing the context from the requester 305 or other element of the system 300. In such a case, the authorization enabler 310 can be further adapted to receive the context information 355 in response to the context request 350 and identify the context based at least in part on the received context information 355.

The authorization enabler 310 can determine whether to authorize the request by applying one or more policies 335 to the request 320 and the context of the request 320. In some cases, the authorization enabler 310 can additionally or alternatively determine whether to authorize the request 320 by delegating at least a part of the determination. In response to determining to authorize the request 320, the authorization enabler 310 can pass the request to the resource 315. In other cases, the authorization enabler 310 can perform or request, on behalf of the requestor 305, an action related to the resource 315 and appropriate to the request 320. Alternatively, in response to determining to authorize the request 320, the authorization enabler 310 can return a response 365 to the requester 305 indicating authorization. In such a case, the response 365 can include authorization information such as a token 370 or other credential for use in accessing the resource 315.

Figure 4:
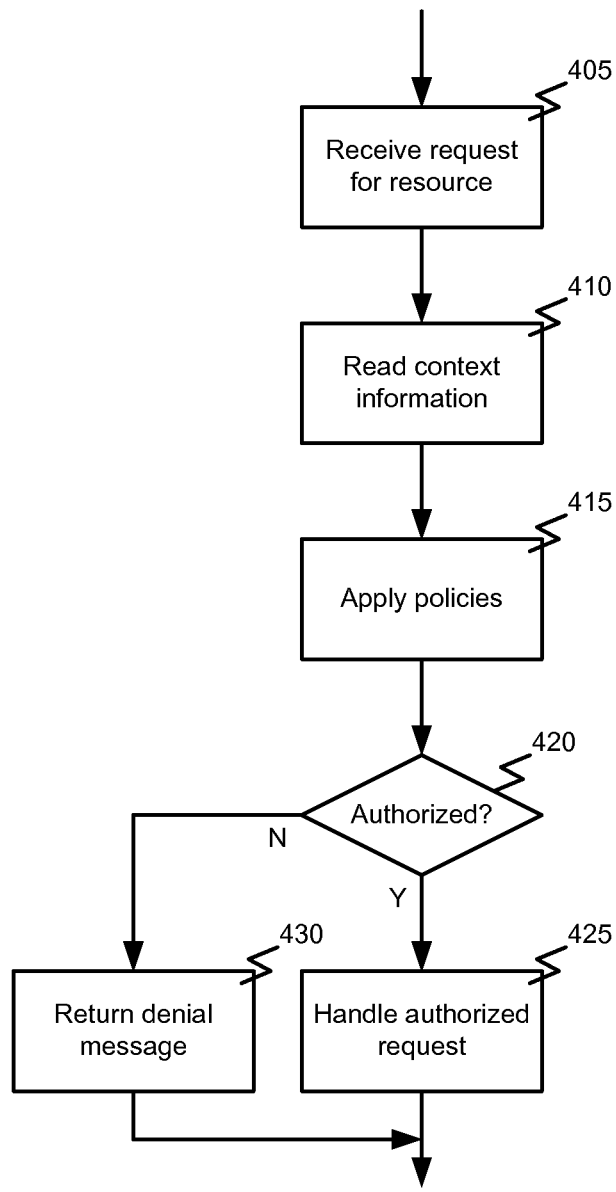
FIG. 4 is a flowchart illustrating a process for authorizing a request to access a resource according to one embodiment of the present invention.

FIG. 4 is a flowchart illustrating a process for authorizing a request to access a resource according to one embodiment of the present invention. More specifically, this example illustrates a process that may be performed by the authorization enabler as described above. In this example, processing begins with receiving 405 a request to access a resource. As noted, the request can include context information describing the context of the request. Therefore, as illustrated here, the context information can be read 410 from the request. One or more policies can then be applied 415 to the request and the context information describing the context of the request. A determination 420 can then be made as to whether the request should be authorized. In response to determining 420 the request should be authorized, the authorized request can then be handled 425. As noted, handling 425 the authorized request can comprise passing the request to the resource as described below with reference to FIG. 6, performing or requesting, on behalf of the requester, an action related to the resource and appropriate to the request, or returning a message to the requestor as described below with reference to FIG. 7. In response to determining 420 the request should not be authorized, a denial message may be returned 430 to the requester.

Figure 5:
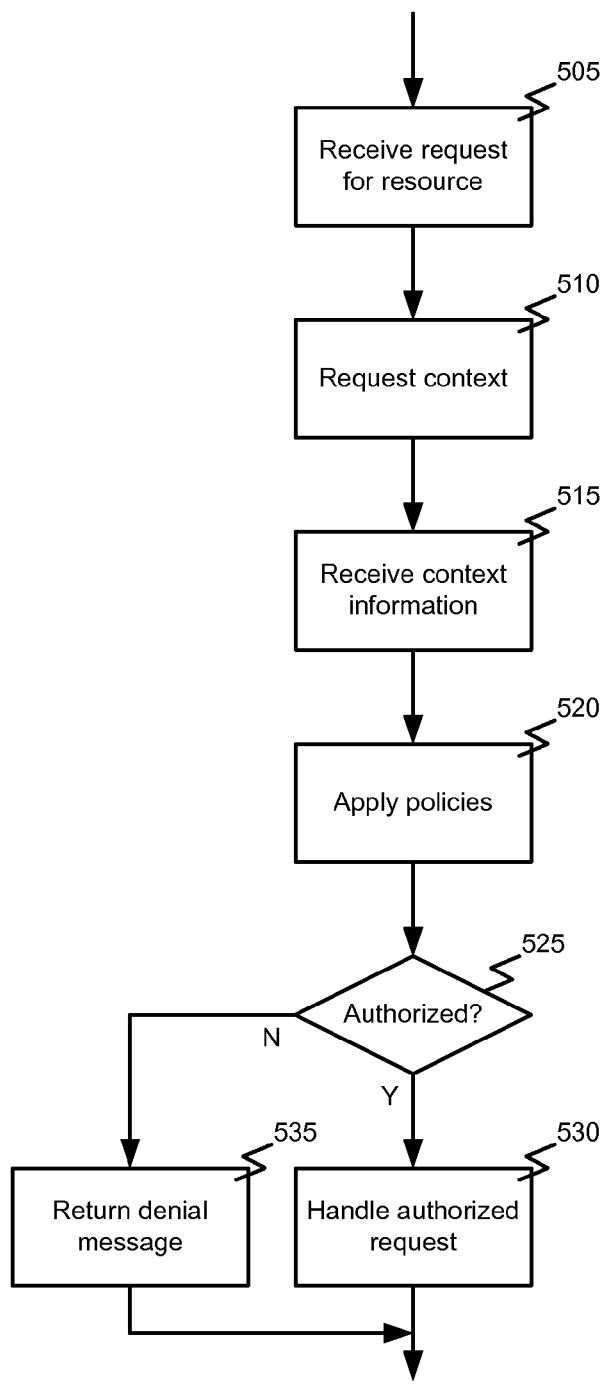
FIG. 5 is a flowchart illustrating a process for authorizing a request to access a resource according to an alternative embodiment of the present invention.

FIG. 5 is a flowchart illustrating a process for authorizing a request to access a resource according to an alternative embodiment of the present invention. More specifically, this example illustrates a process that may be performed by the authorization enabler as described above. However, this example differs from that described above with reference to FIG. 4 in that the context information describing the context of the request to access a resource is requested and received from the requestor or other device or entity rather than included in the request. It should be understood that, as noted above, these methods need not be exclusive. That is, in some cases in addition to the context information provided with and read from the request as described above, context information describing the context of the request can be requested and received as described here. In some cases, a decision or selection of which method to implement to determine the context can be based on application of one or more policies.

In the example illustrated in FIG. 5, processing begins with receiving 505 a request to access a resource. A request 510 can then be made for context information describing the context of the request. As described above, the request 510 for context information describing the context can be made to the original requester or to another element of the system such a presence service. In response, the context information can be received 515 and read. One or more policies can then be applied 520 to the request and the context information describing the context of the request. A determination 525 can then be made as to whether the request should be authorized. In response to determining 525 the request should be authorized, the authorized request can then be handled 530. As noted, handling 530 the authorized request can comprise passing the request to the resource as described below with reference to FIG. 6, performing or requesting, on behalf of the requester, an action related to the resource and appropriate to the request, or returning a message to the requester as described below with reference to FIG. 7. In response to determining 525 the request should not be authorized, a denial message may be returned 535 to the requester.

Figure 6:
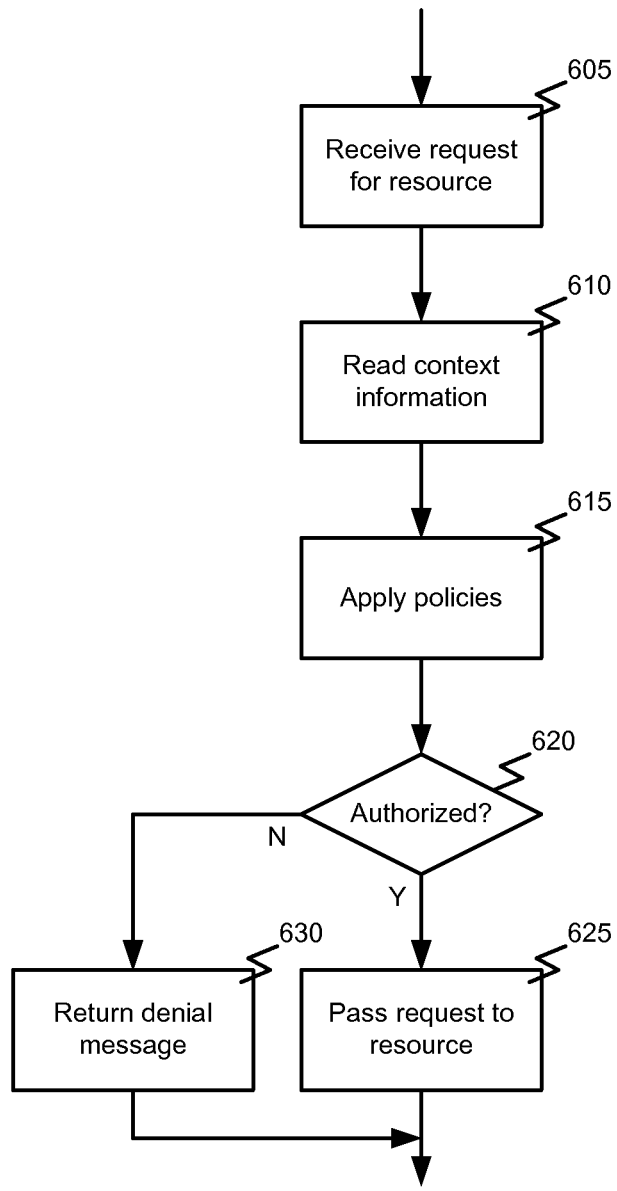
FIG. 6 is a flowchart illustrating a process for authorizing a request to access a resource including additional details of handling an authorized request according to one embodiment of the present invention.

FIG. 6 is a flowchart illustrating a process for authorizing a request to access a resource including additional details of handling an authorized request according to one embodiment of the present invention. In this example, processing begins with receiving 605 a request to access a resource. As noted and described above with reference to FIG. 4, the request can include context information describing the context of the request. Additionally or alternatively, context information describing the context of the request can be requested and received as described above with reference to FIG. 5. In either case, the context information can be read 610. One or more policies can then be applied 615 to the request and the context information describing the context of the request. A determination 620 can then be made as to whether the request should be authorized. In response to determining 620 the request should be authorized, the authorized request can then be passed 625 to the resource thereby allowing the requester to access the resource. In response to determining 620 the request should not be authorized, a denial message may be returned 630 to the requester.

Figure 7:
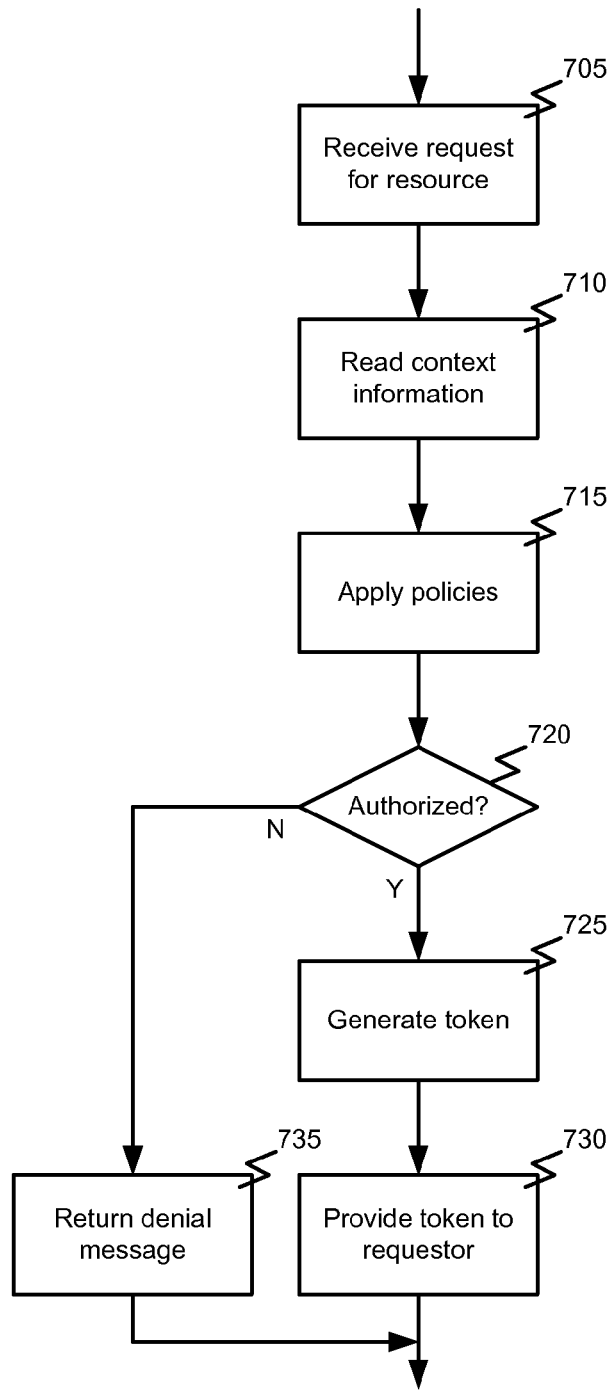
FIG. 7 is a flowchart illustrating a process for authorizing a request to access a resource including additional details of handling an authorized request according to an alternative embodiment of the present invention.

FIG. 7 is a flowchart illustrating a process for authorizing a request to access a resource including additional details of handling an authorized request according to an alternative embodiment of the present invention. In this example, processing begins with receiving 705 a request to access a resource. As noted and described above with reference to FIG. 4, the request can include context information describing the context of the request. Additionally or alternatively, context information describing the context of the request can be requested and received as described above with reference to FIG. 5. In either case, the context information can be read 710. One or more policies can then be applied 715 to the request and the context information describing the context of the request. A determination 720 can then be made as to whether the request should be authorized. In response to determining 720 the request should not be authorized, a denial message may be returned 735 to the requester. In response to determining 720 the request should be authorized, authorization information such as a token can be generated 725. The authorization information can comprise any of a variety of verifiable tokens or credentials, e.g., a message signed by the authentication enabler, that can be used to allow access of the resource. The authorization information can be provided 730 to the requester, for example, in a reply message to the requester. The authorization information can then be used by the requestor to directly request access from the resource. In some cases, the recipient of the authorization information can contact the authorization enabler to validate the authorization information based on the request it received.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of authorizing a request for a resource based on a context of the request, the method comprising:
   receiving at an authorization system the request from a requestor;
   requesting by the authorization system context information describing the context of the request;

receiving at the authorization system the context information in response to the request, the context information including information identifying an intended use of the resource by the requestor if the request is authorized and wherein the intended use of the resource is not indicated by the request;

identifying by the authorization system the context of the request based on the received context information including the information identifying the intended use of the resource; and determining by the authorization system whether to authorize the request based on the context of the request.

2. The method of claim 1, wherein requesting the context information comprises requesting the context information from the requestor.

3. The method of claim 1, wherein requesting the context information comprises requesting the context information from an entity other than the requestor.

4. The method of claim 1, wherein determining whether to authorize the request comprises applying one or more policies to the request and the context of the request.

5. The method of claim 4, wherein determining whether to authorize the request further comprises delegating at least a part of the determination.

6. The method of claim 1, further comprising, in response to determining to authorize the request, passing the request to the resource.

7. The method of claim 1, further comprising, in response to determining to authorize the request, returning a response to the requestor indicating authorization.

8. The method of claim 7, wherein authorization is conditioned on the context of the request.

9. The method of claim 7, wherein the response includes information indicating authorization.

10. The method of claim 9, wherein the information indicating authorization comprises a token for accessing the resource.

11. The method of claim 1, further comprising, in response to determining to authorize the request, performing an action indicated by the request on behalf of the requestor.

12. An authorization system comprising:
a processor; and
a memory communicatively coupled with and readable by the processor and having stored therein a sequence of instructions which, when executed by the processor, cause the processor to receive a request from a requestor, request context information describing the context of the request, receive the context information in response to the request, the context information including information identifying an intended use of the resource by the requestor if the request is authorized and wherein the intended use of the resource is not indicated by the request, identify a context of the request based on the received context information including the information identifying the intended use of the resource, and determine whether to authorize the request based on the context of the request.

13. The system of claim 12, wherein requesting the context information comprises requesting the context information from the requestor.

14. The system of claim 12, wherein requesting the context information comprises requesting the context information from an entity other than the requestor.

15. The system of claim 12, wherein the authorization system determines whether to authorize the request by applying one or more policies to the request and the context of the request.

16. The system of claim 15, wherein the authorization system determines whether to authorize the request further by delegating at least a part of the determination.

17. The system of claim 12, wherein the authorization system, in response to determining to authorize the request, passes the request to the resource.

18. The system of claim 12, wherein the authorization system, in response to determining to authorize the request, returns a response to the requestor indicating authorization.

19. The system of claim 18, wherein authorization is conditioned on the context of the request.

20. The system of claim 18, wherein the response includes information indicating authorization.

21. The system of claim 20, wherein the information indicating authorization comprises a token for accessing the resource.

22. The system of claim 12, wherein the authorization system is further adapted to performing an action indicated by the request on behalf of the requestor in response to determining to authorize the request.

23. A machine-readable memory having stored thereon a series of instructions which, when executed by a processor, cause the processor to authorize a request for a resource based on a context of the request by:
receiving the request from a requestor;
requesting context information describing the context of the request;
receiving the context information in response to the request, the context information including information identifying an intended use of the resource by the requestor if the request is authorized and wherein the intended use of the resource is not indicated by the request;
identifying the context of the request based on the received context information including the information identifying the intended use of the resource; and
determining whether to authorize the request based on the context of the request.

24. The machine-readable memory of claim 23, further comprising, in response to determining to authorize the request, passing the request to the resource.

25. The machine-readable memory of claim 23, further comprising, in response to determining to authorize the request, returning a response to the requestor indicating authorization.

26. The machine-readable memory of claim 25, wherein the response includes information indicating authorization.

27. The machine-readable memory of claim 23, further comprising, in response to determining to authorize the request, performing an action indicated by the request on behalf of the requestor.

* * * * *